United States Patent
Danilychev

Patent Number: 6,144,036
Date of Patent: Nov. 7, 2000

[54] ULTRAVIOLET RADIATION DOSIMETER

[76] Inventor: Vladimir A. Danilychev, 4501 Pinyon Tree La., Irvine, Calif. 92715

[21] Appl. No.: 09/136,178

[22] Filed: Aug. 19, 1998

[51] Int. Cl.[7] .................................................. G01F 1/02
[52] U.S. Cl. ............................................................ 250/372
[58] Field of Search ........................................... 250/372

[56] References Cited

U.S. PATENT DOCUMENTS

| | | | |
|---|---|---|---|
| 4,608,492 | 8/1986 | Burnham | 250/372 |
| 4,704,535 | 11/1987 | Leber et al. | 250/372 |

*Primary Examiner*—Constantine Hannaher
*Assistant Examiner*—Otilia Gabor
*Attorney, Agent, or Firm*—Stetina Brunda Garred & Brucker

[57] ABSTRACT

An ultraviolet radiation dosimeter for obtaining a measurement of ultraviolet radiation from an ultraviolet radiation source. The dosimeter comprises an electric charge generating unit which is adapted to be irradiated by the ultraviolet radiation source and operable to produce an electric charge which is proportional to the amount of ultraviolet radiation to which the generating unit is exposed. Electrically connected in parallel with the generating unit is an electric charge storage unit which is operable to store the electric charge produced by the generating unit. Additionally, electrically connected in series between the generating unit and the storage unit is a directional coupler for allowing the electric charge to flow in only a prescribed direction between the generating unit and the storage unit. An electric charge limiter is electrically connected in series with the directional coupler for limiting the flow of the electric charge through the coupler, with an electrometric unit having a display being electrically connected in parallel with the storage unit. The electrometric unit is operable to convert the electric charge to a reading which corresponds to the amount of ultraviolet radiation generated by the ultraviolet radiation source, and presents the reading on the display.

23 Claims, 2 Drawing Sheets

ULTRAVIOLET RADIATION DOSIMETER

FIELD OF THE INVENTION

The present invention generally relates to measuring devices, and more particularly to an ultraviolet radiation measuring device or dosimeter which utilizes ultraviolet radiation as its primary power source and can be operated without an external power supply.

BACKGROUND OF THE INVENTION

It is well known in the scientific community that ultraviolet radiation has the distinctive ability to cut electrons from an atom or molecule, thereby creating an electric charge. The amount of free electrons and total electric charge generated by ultraviolet radiation is proportional to the amount or quanta and total energy of the ultraviolet radiation applied to the object in which the electric charge is generated. The process of generating an electric charge via the exposure of an object to ultraviolet radiation does not require any external energy, a battery, or power supply, but rather requires only the ultraviolet radiation itself.

The process of cutting an electron from an atom or molecule is extremely fast, and usually less than about $10^{-13}$ seconds. Accordingly, an electric charge may be created by continuous ultraviolet radiation, as well as by pulsed ultraviolet radiation. The value of the electric charge generated by the ultraviolet radiation is generally very small, and sometimes almost unmeasurable. However, with very high intensities of ultraviolet radiation as are typically employed in industrial applications, such high intensities allow the electric charge created by the ultraviolet radiation to be measured, thus allowing for the dose of the ultraviolet radiation applied to an irradiated object to be measured.

Ultraviolet radiation measuring devices (often referred to as "dosimeters") are frequently used in various industries, including the optical lens industry, the ultraviolet curing industry, and the ultraviolet photolithography and printing industry. Prior art ultraviolet radiation measuring devices typically include a sensor for producing an electric signal under the influence of ultraviolet radiation, and a display for showing the value of the ultraviolet radiation level. In addition to the sensor and display, these prior art devices include electronic circuitry which is used to convert the electric signal produced by the sensor from the exposure thereof to the ultraviolet radiation to a form that is presentable on the display. Such electronic circuitry typically includes integrating and amplifying units, as well as other electronic components. Subsequent to the electronic integration of the signal, this "sample and hold" electronic circuitry is operable to present on the display a measured dose of the ultraviolet radiation applied to the sensor, as well as a peak intensity of the ultraviolet radiation.

However, in the prior art ultraviolet radiation measuring devices, the sensor, as well as other electronic components of the electronic circuitry, require electric power for the proper operation thereof. As such, the prior art measuring devices must also be provided with internal and/or external power supplies to provide electrical power to both the sensor and electronic circuitry thereof. Additionally, such prior art measuring devices are typically very complex in construction, and susceptible to failure due to the relative complexity of the electronic circuitry therein.

The present invention addresses and overcomes the above-described deficiencies of prior art ultraviolet radiation measuring devices by providing an ultraviolet radiation dosimeter which utilizes as its primary source of energy the ultraviolet radiation itself. In this respect, the electrical components of the present dosimeter are powered by the energy of the measured ultraviolet radiation, with an external power supply being needed only if a digital or analog electrometer is employed in the dosimeter for purposes of powering the display thereof. However, since the display consumes so little power, the external power needs of the present dosimeter can be served for a prolonged time frame by a simple coin lithium battery. The need for any external power supply whatsoever may be completely eliminated in the present dosimeter by utilizing a standard repulsive charge electrometer as an alternative to a digital or analog electrometer. The present dosimeter is also compact and easy to use, and significantly more simple and cost effective to manufacture than those known in the prior art.

SUMMARY OF THE INVENTION

In accordance with the present invention, there is provided an ultraviolet radiation dosimeter for obtaining a measurement of ultraviolet radiation from an ultraviolet radiation source. In order for the proper operation thereof to occur, the ultraviolet radiation dosimeter of the present invention requires a high level of ultraviolet radiation power. More particularly, the operational range of the present dosimeter is limited to high power ultraviolet radiation with a total dosage starting from about 0.1 mJ/cm$^2$. The dosimeter comprises an electric charge generating unit which is adapted to be irradiated by the ultraviolet radiation source and is operable to produce an electric charge which is proportional to the amount of ultraviolet radiation to which the generating unit is exposed. In the preferred embodiment, the generating unit has a leakage impedance of not more than about 100 mega-ohms, and generates not less than about 1 pico-coulomb of the electric charge per 1 joule of ultraviolet radiation. It is contemplated that the generating unit may comprise either a vacuum phototube having a long wavelength cut-off equal to the long wavelength limit of the desired sensitivity of the dosimeter, a light emitting diode (LED) having a peak emission wavelength equal to the long wavelength limit of the desired sensitivity of the dosimeter, or a solid state photodiode having a reverse impedance of not less than about 100 mega-ohms.

In addition to the generating unit, the dosimeter of the present invention includes an optical attenuator which is disposed between the ultraviolet radiation source and the generating unit. The optical attenuator is operable to decrease the amount of ultraviolet radiation to which the generating unit is exposed to a prescribed level. Preferably disposed between the optical attenuator and the generating unit is an optical short wavelength cut-off filter of the present dosimeter which is operable to limit the spectrum of the ultraviolet radiation to which the generating unit is exposed to within a prescribed range. Additionally, in the present dosimeter, an optical window is preferably disposed between the filter and the generating unit to protect the generating unit from dust and moisture. However, it is contemplated that the optical window may be fabricated from a material which causes the spectrum of the ultraviolet radiation passing therethrough to be limited to within the prescribed wavelength band transmission range, thus eliminating the need for the separate cut-off filter.

The present dosimeter further comprises an electric charge storage unit which is electrically connected in parallel with the generating unit and is operable to store the electric charge produced by the generating unit. The storage unit has a preferred leakage impedance in ohms of not less than about 10 U/q where U is the electric potential of the storage unit in volts and q is the value of the stored electric charge in coulombs. The preferred storage unit of the present dosimeter is an electric capacitor having a leakage resistance of not less than about 100 mega-ohms.

Electrically connected in series between the generating unit and the storage unit is a directional coupler of the present dosimeter which allows the electric charge to flow in only a prescribed direction between the generating unit and the storage unit. The preferred directional coupler of the present dosimeter has a reverse impedance of not less than about 100 mega-ohms, and a direct flow impedance of not more than about 10 mega-ohms. The directional coupler may comprise either a silicon rectifier, a germanium rectifier, or any other component providing reverse and direct flow impedance in the desired ranges. Additionally, the generating unit itself may serve as the directional coupler, therefore eliminating the need for a separate directional coupler element within the present dosimeter.

In addition to the above-described components, the present dosimeter includes an electric charge limiter which is electrically connected in series with the directional coupler, and is used for limiting the flow of the electric charge through the directional coupler. The preferred limiter is an electric resistor having a value of between about 100 ohms and 1 mega-ohm. Also included in the present dosimeter is an electrometric unit which is electrically connected in parallel with the storage unit and includes a display. The electrometric unit is operable to convert the electric charge to a reading corresponding to the amount of ultraviolet radiation produced by the ultraviolet radiation source, and present the reading on the display. More particularly, the electrometric unit, which is able to detect the level of the electric charge, may be calibrated such that the value of the electric charge detected thereby is correlated to a particular ultraviolet radiation dosage level, thus allowing the reading presented on the display to closely correspond to the ultraviolet radiation level without the need to refer to a separate conversion table for purposes of converting the value of the electric charge to an ultraviolet radiation reading. Advantageously, such calibration of the electrometer may be assisted through the use of the electric charge limiter of the dosimeter.

A preferred electrometric unit for the present dosimeter is a digital panel member having an input impedance of not less than about 100 mega-ohms. When the electrometric unit comprises a digital panel member or an analog panel member including the display, the dosimeter further comprises a power supply and an on/off switch for selectively applying power from the power supply to the electrometric unit. The power supply is needed to provide power to the display, and preferably comprises a lithium battery having an electric capacity of not less than about 10 mA/hour. The switch itself preferably has an insulation resistance of not less than about 10 mega-ohms. As indicated above, the electrometric unit is calibrated such that the reading presented on the display, which corresponds to the value of the electric charge stored in the storage unit, is representative of the amount of ultraviolet radiation produced by the ultraviolet radiation source.

The present dosimeter further preferably comprises an electric charge discharge member which is electrically connected in parallel with the storage unit. The discharge member is operable to selectively discharge the electric charge stored within the storage unit for purposes of resetting the dosimeter for new ultraviolet radiation measurements. The preferred discharge member is an electric switch having an insulation resistance of not less than about 50 mega-ohms.

In the preferred embodiment, the electrometric unit of the dosimeter is electrically connected to the other components thereof via a pair of cables which extend therebetween. As such, the electrometric unit of the dosimeter is selectively detachable from the remainder thereof. The cables each preferably have an insulation resistance of not less than about 100 mega-ohms, and a length of between about 2 and 200 inches. When the cables are employed in the present dosimeter, it is contemplated that the electrometric unit and the remaining components of the dosimeter will be enclosed in separate housings which are electrically connected to each other via the cables and, as indicated above, are selectively detachable from each other. Such separability allows the components of the dosimeter other than for the electrometric unit to be positioned in a desired measurement location, with the connection of the electrometric unit thereto occurring only when it is desired to obtain an ultraviolet radiation measurement based on the electric charge stored within the storage unit. Indeed, ultraviolet radiation measurements may be obtained up to 24 hours subsequent to the exposure of the generating unit to the ultraviolet radiation.

It will be recognized that all of the components of the dosimeter may also be enclosed in a single housing. One such preferred housing is made of a metal or plastic material, and has a shape similar to that of an optical lens. More particularly, this circularly configured housing has a height of about 0.75 inches and a diameter of about 3.0 inches, with the optical window being mounted on one side of the housing and the display of the electrometric unit being mounted to the opposite side thereof. When the components of the dosimeter are separately housed, the electric charge generating unit along with the optical attenuator, optical filter, and optical window may be enclosed in one metal tube having a diameter of not more than about 0.5 inches and a length of not less than about 1.0 inches, with such tube being electrically connected to the electric charge generating unit and storage unit which are placed in another metal container along with the remainder of the dosimeter elements.

In the present dosimeter, the external power supply is needed only if a digital or analog electrometer is employed as the electrometric unit. In this respect, the electric power provided by the power supply is needed only to power the display of the electrometric unit so that it can present the reading corresponding to the measurement of ultraviolet radiation. The power provided by the power supply is not needed for any other component of the dosimeter. Since the total energy consumption of the display, and consequently the whole dosimeter, is so low, the same can operate on a coin lithium battery for up to three to five years, without replacing or recharging the battery after more than about 100,000 dose measuring events. It will be recognized that the need for the external power supply in the present dosimeter can be completely eliminated if, rather than a digital or analog electrometer, the readings of the electronic charge are picked up visually without any source of external electric energy via the use of a standard repulsive charge electrometer.

Because the dosimeter of the present invention measures electric charge and not electric current or voltage, amplifiers or other components which require an external power supply for their functionality need not be included in the dosimeter. Indeed, as indicated above, the dosimeter of the present invention is operational through the power supplied by the ultraviolet radiation itself, and need be outfitted with an external power supply only if a digital or analog electrometer is employed therein, with such power supply being used only for the operation of the display of such electrometer.

Because it relies upon the energy of the ultraviolet radiation itself for its operation, a high level of ultraviolet radiation power is necessary for the proper operation of the present dosimeter. More particularly, as also indicated above, the operational range of the present dosimeter is limited to high power ultraviolet radiation with a total dosage starting from about 0.1 millijoule per $cm^2$.

As also indicated above, the electrometric unit of the present dosimeter can be disconnected from the generating and storage units during ultraviolet radiation measurements, and used only to pick-up the value of the stored electric charge (which represents the dose of the ultraviolet radiation applied to the generating unit) when desired. As such, the electrometric measurement of the stored electric charge can be done long after the ultraviolet radiation measurement has been completed and, in the case of a high quality, low leakage storage unit, can even be done up to a day following the measurement.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
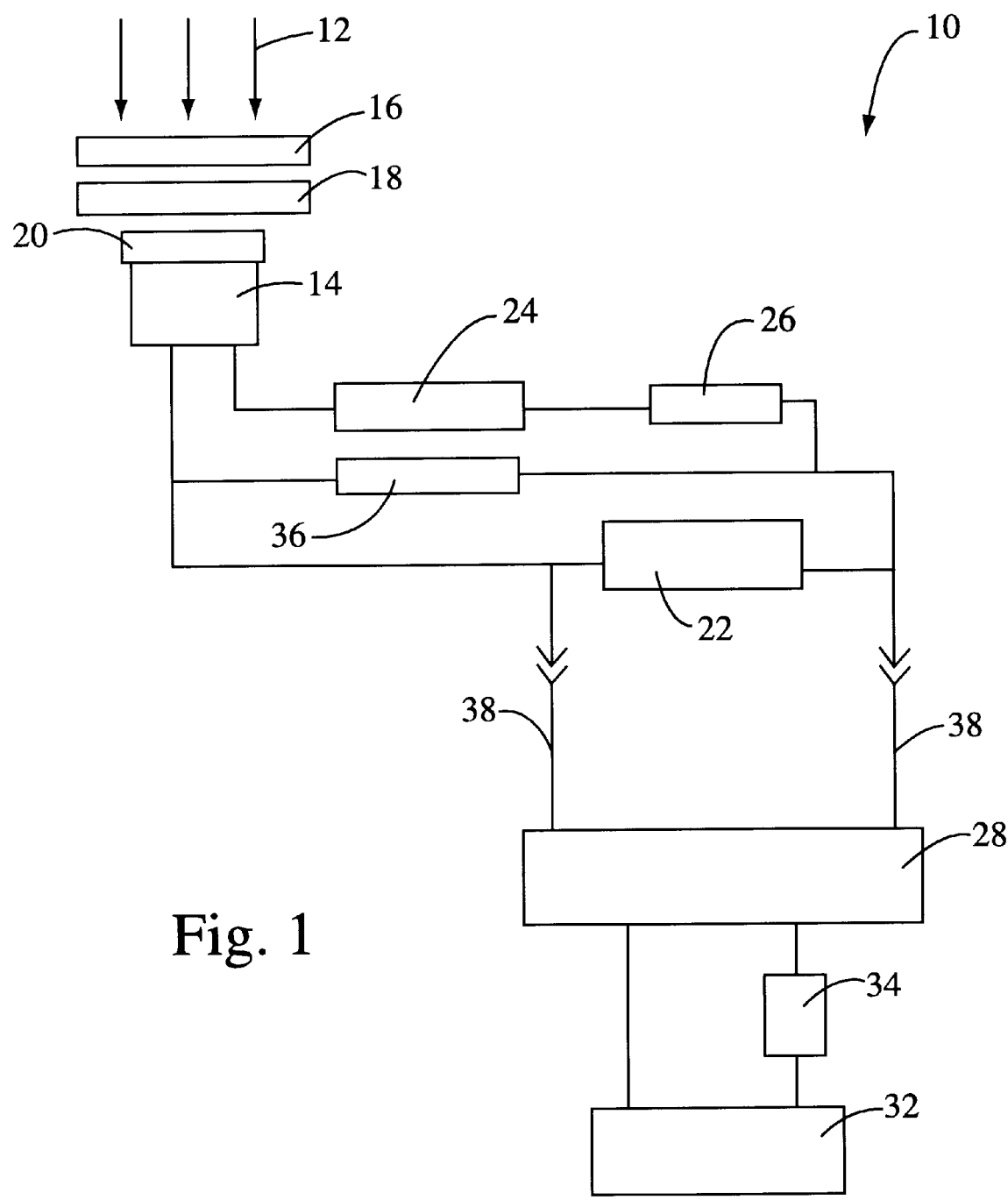
FIG. 1 is a block level diagram of the ultraviolet radiation dosimeter constructed in accordance with the present invention.

Referring now to the drawings wherein the showings are for purposes of illustrating a preferred embodiment of the present invention only, and not for purposes of limiting the same, FIG. 1 is a high level block diagram of the ultraviolet radiation dosimeter 10 constructed in accordance with the preferred embodiment of the present invention. The dosimeter 10 is used for obtaining a measurement of ultraviolet radiation 12 from an ultraviolet radiation source (not shown). In order for the proper operation thereof to occur, the dosimeter 10 of the present invention requires a high level of ultraviolet radiation power. More particularly, the operational range of the dosimeter 10 is limited to high power ultraviolet radiation with a total dosage starting from about 0.1 millijoules per $cm^2$.

The present dosimeter 10 comprises an electric charge generating unit 14 which is adapted to be irradiated by the ultraviolet radiation 12 generated from an ultraviolet radiation source, and is operable to produce an electric charge which is proportional to the amount of ultraviolet radiation 12 to which the generating unit 14 is exposed. In the preferred embodiment, the generating unit 14 has a leakage impedance of not more than about 100 mega-ohms, and generates not less than about 1 pico-coulomb of the electric charge per one joule of ultraviolet radiation 12. It is contemplated that the generating unit 14 may comprise either a vacuum phototube having a long wavelength cut-off equal to the long wavelength limit of the desired sensitivity of the dosimeter 10, a light emitting diode (LED) having a peak emission wavelength equal to the long wavelength limit of the desired sensitivity of the dosimeter 10, or a solid state photodiode having a reverse impedance of not less than about 100 megaohms. Those of ordinary skill in the art will recognize that the generating unit 14 may comprise any device capable of generating an electric charge in proportion to its level of exposure to the ultraviolet radiation 12.

In addition to the generating unit 14, the dosimeter 10 of the present invention includes an optical attenuator 16 which is disposed between the ultraviolet radiation source and the generating unit 14. The optical attenuator 16 is operable to decrease the incident power of the ultraviolet radiation 12 to which the generating unit 14 is exposed to a prescribed level. Preferably disposed between the optical attenuator 16 and the generating unit 14 is an optical short wavelength cut-off filter 18 which is operable to limit the spectrum of the ultraviolet radiation 12 to which the generating unit 14 is exposed to a prescribed bandwidth which is preferably between about 185 to 420 nm. As such, the filter 16 is a short wavelength limiting filter that only allows ultraviolet radiation 12 within a prescribed range or bandwidth to be passed therethrough and ultimately measured.

Additionally, in the dosimeter 10, an optical window 20 is preferably disposed between the filter 18 and the generating unit 14 to protect the generating unit 14 from dust and moisture. As will be recognized, the optical window 20 is fabricated from a material which is transparent to the ultraviolet radiation 12. Additionally, the optical window 20 is preferably placed over an opening within the generating unit 14 which allows for the passage of the ultraviolet radiation 12 thereinto. However, it is contemplated that the optical window 20 may be fabricated from an optical material having properties which allow for the transmission of the desired bandwidth of the ultraviolet radiation 12 therethrough, thus eliminating the need for the separate long wave filter 18 within the dosimeter 10.

The dosimeter 10 of the present invention further comprises an electric charge storage unit 22 which is electrically connected in parallel with the generating unit 14 and is operable to store the electric charge produced by the generating unit 14. The storage unit 22 has a preferred leakage impedance in ohms of not less than about 10 U/q where U is the electric potential of the storage unit 22 in volts and q is the value of the stored electric charge in coulombs. A preferred storage unit 22 of the dosimeter 10 is a capacitor having a leakage resistance of not less than about 100 mega-ohms. As will be discussed in more detail below, the storage unit 22 has the capability to maintain the electric charge stored therein for an extended period of time, and up to 24 hours after the electric charge is transferred thereto from the generating unit 14.

Electrically connected in series between the generating unit 14 and the storage unit 22 is a directional coupler 24 of the present dosimeter 10 which allows the electric charge to flow in only a prescribed direction between the generating unit 14 and the storage unit 22. In this respect, the directional coupler 24 directs the electric charge away from the generating unit 14 in a single direction. The preferred directional coupler 24 of the dosimeter 10 has a reverse impedance of not less than about 100 mega-ohms, and a direct flow impedance of not more than about 10 mega-ohms. The directional coupler 24 may comprise either a silicon rectifier, a germanium rectifier, or any other component providing reverse and direct flow impedance in the desired ranges. Additionally, the generating unit 14 itself may serve as the directional coupler, therefore eliminating the need for a separate directional coupler element within the dosimeter 10.

In addition to the above-described components, the 10 present dosimeter 10 includes an electric charge limiter 26 which is electrically connected in series with the directional coupler 24, and is used for limiting the flow of the electric charge through the directional coupler 24. Thus, the limiter 26 limits the value of the electric charge emanating from the generating unit 14 which flows through the directional coupler 24. A preferred limiter 26 is an electric resistor having a value of between about 100 ohms and 1 mega-ohm.

Also included in the dosimeter 10 of the present invention is an electrometric unit 28 which is electrically connected in parallel with the storage unit 22 and includes a display 30. The electrometric unit 28 is operable to measure the amount of the electric charge in the storage unit 22 by standard charge measurement techniques. The electrometric unit 28 is also operable to convert the electric charge to a reading corresponding to the amount of ultraviolet radiation 12 produced by the ultraviolet radiation source, and present the reading on the display 30. More particularly, the electrometric unit 28, which is able to detect the level of the electric charge, may be calibrated such that the value of the electric charge detected thereby is correlated to a particular ultraviolet radiation dosage level, thus allowing the reading presented on the display 30 to closely correspond to the ultraviolet radiation level without the need to refer to a separate conversion table for purposes of converting the value of the electric charge to an ultraviolet radiation reading. Advantageously, such calibration of the electrometric unit 28 may be assisted through the use of the limiter 26 of the dosimeter 10.

A preferred electrometric unit 28 for the dosimeter 10 is a digital panel member having an input impedance of not less than about 100 mega-ohms. When the electrometric unit 28 comprises a digital panel member or an analog panel member including the display 30, the dosimeter 10 further comprises a power supply 32 and an on/off switch 34 for selectively applying power from the power supply 32 to the electrometric unit 28. The power supply 32 is needed to provide power to the display 30, and preferably comprises at least one lithium battery having an electric capacity of not less than about 10 mA/hour. The switch 34 itself preferably has an insulation resistance of not less than about 10 mega-ohms. After the value of the electric charge in the storage unit 22 has been measured, the switch 34 is depressed in order to provide power to the display 30 from the power supply 32. The display 30 will then present an ultraviolet radiation level reading. As indicated above, the electrometric unit 28 is calibrated such that the reading presented on the display 30, which corresponds to the value of the electric charge stored in the storage unit 22, is representative of the amount of ultraviolet radiation 12 produced by the ultraviolet radiation source.

The dosimeter 10 of the present invention further preferably comprises an electric charge discharge member 36 which is electrically connected in parallel with the storage unit 22. The discharge member 36 is operable to selectively discharge the electric charge stored within the storage unit 22 for purposes of resetting the dosimeter 10 for new ultraviolet radiation measurements. In this respect, the electric charge in the storage unit 22 is dissipated by the short circuiting action of the discharge member 36 across the storage unit 22. A preferred discharge member 36 is an electric switch having an insulation resistance of not less than about 50 mega-ohms.

In the preferred embodiment, the electrometric unit 28 of the dosimeter 10 is electrically connected to the other components thereof via a pair of cables 38 which extend therebetween. As such, the electrometric unit 28 of the dosimeter 10 is selectively detachable from the remainder thereof. The cables 38 each preferably have an insulation resistance of not less than about 100 mega-ohms, and a length of between about 2 and 200 inches. When the cables 38 are employed in the present dosimeter 10, it is contemplated that the electrometric unit 28 and the remaining components of the dosimeter 10 will be enclosed in separate housings which are electrically connected to each other via the cables 38 and, as indicated above, are selectively detachable from each other. Such separability allows the components of the dosimeter 10 other than for the electrometric unit 28 to be positioned in a desired measurement location, with the connection of the electrometric unit 28 thereto occurring only when it is desired to obtain an ultraviolet radiation measurement based on the electric charge stored within the storage unit 22. Indeed, ultraviolet radiation measurements may be obtained up to 24 hours subsequent to the exposure of the generating unit 14 to the ultraviolet radiation 12. Though not shown, those of ordinary skill in the art will recognize that the cables 38 may be integrated into a single coaxial cable which is configured such that the electrometric unit 28 is selectively detachable from the remainder of the dosimeter 10.

Figure 2:
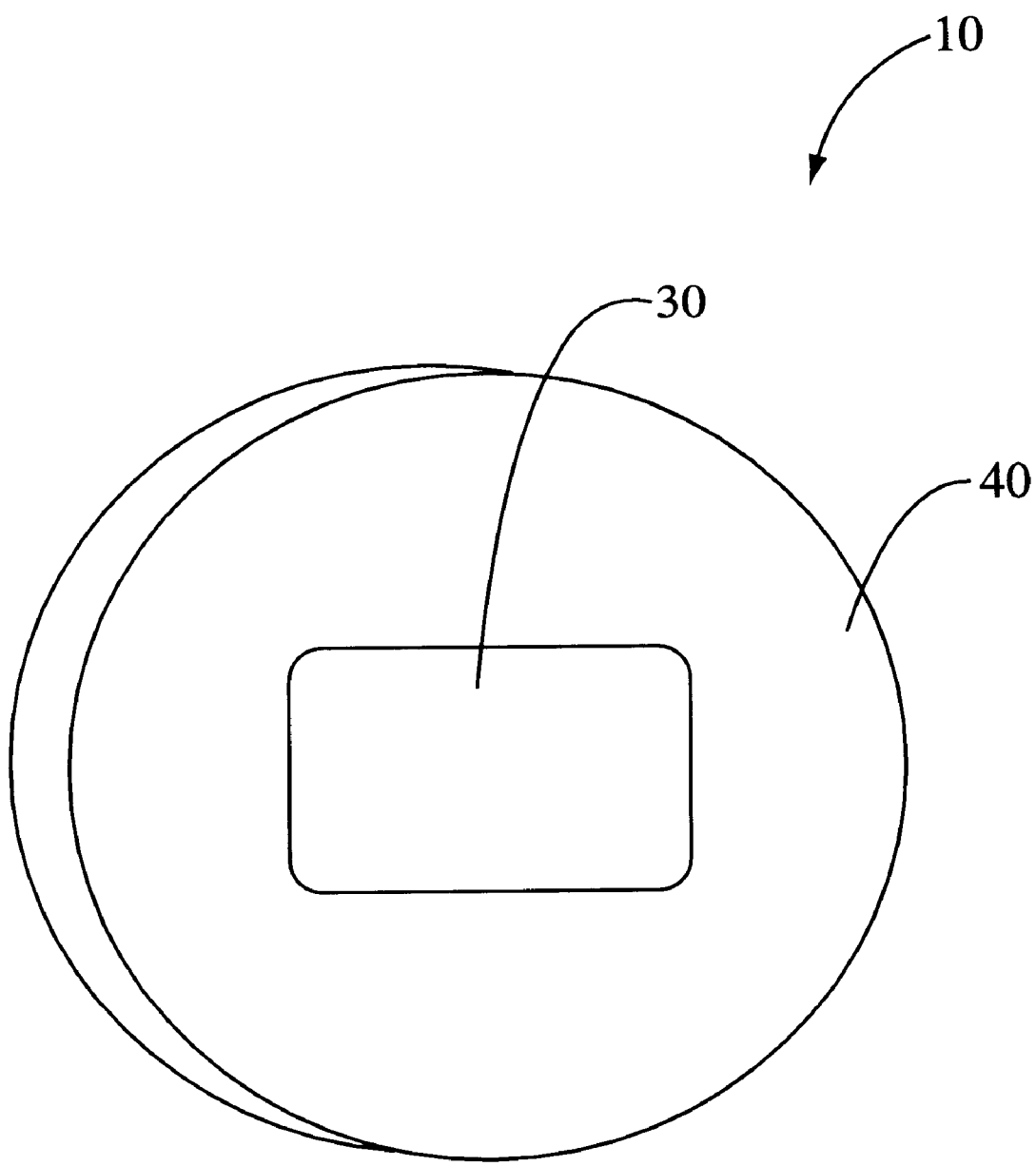
FIG. 2 is a front perspective view of a lens-shaped embodiment of the present invention.

Referring now to FIG. 2, it will be recognized that all of the components of the dosimeter 10 may also be enclosed in a single housing. One such preferred housing 40 is made of a metal or plastic material, and has a circular shape similar to that of an optical lens. More particularly, this circularly configured housing 40 has a height of about 0.75 inches and a diameter of about 3.0 inches, with the optical window 20 being mounted on one side of the housing 40 and the display 30 of the electrometric unit 28 being mounted to the opposite side thereof. When the components of the dosimeter 10 are separately housed, the electric charge generating unit 14 along with the optical attenuator 16, optical filter 18, and optical window 20 may be enclosed in one metal tube having a diameter of not more than about 0.5 inches and a length of not less than about 1.0 inches, with such tube being electrically connected to the electric charge generating unit 14 and storage unit 22 which are placed in another metal or plastic container along with the remainder of the dosimeter elements.

In the dosimeter 10 of the present invention, an external power supply is needed only if a digital or analog electrometer is employed as the electrometric unit 28. In this respect, the electric power provided by the power supply is needed only to power the display 30 of the electrometric unit 28 so that it can present the reading corresponding to the measurement of ultraviolet radiation 12. The power provided by the power supply is not needed for any other component of the dosimeter 10. Since the total energy consumption of the display 30, and consequently the whole dosimeter 10, is so low, the same can operate on a coin lithium battery for up to three to five years, without replacing or recharging the battery after more than about 100,000 dose measuring events. It will be recognized that the need for the external power supply in the dosimeter 10 can be completely eliminated if, rather than a digital or analog electrometer, the readings of the electronic charge are picked-up visually without any source of external electric energy via the use of a standard repulsive charge electrometer.

An exemplary dosimeter 10 of the present invention can be constructed by utilizing a generating unit 14 comprising of vacuum phototube with a CsTe photocathode and having a reverse internal impedance of about 10,000 mega-ohms. Connected in parallel with such generating unit 14 is a low leakage 10 micro-farad capacitor as the storage unit 22 which has a resistance of about 100,000 mega-ohms. The electrometric unit 28 may comprise a digital panel LCD meter having an input impedance of above or about 1,000 mega-ohms. In the dosimeter 10, a lithium battery may be used as the power supply 32. The value of the radiation measurement may be read for up to 24 hours to within about a two percent accuracy. This particular dosimeter 10 could measure ultraviolet radiation 12 in the dosage range of about 1 mJ/cm$^2$ up to about 20 J/cm$^2$ and between a spectrum of about 185 to 320 nm.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. An ultraviolet radiation dosimeter for obtaining a measurement of ultraviolet radiation from an ultraviolet radiation source, the dosimeter comprising:

an electric charge generating unit adapted to be irradiated by the ultraviolet radiation source and operable to produce an electric charge which is proportional to the amount of ultraviolet radiation to which the generating unit is exposed;

an electric charge storage unit electrically connected in parallel with the generating unit and operable to store the electric charge produced thereby;

an directional coupler electrically connected in series between the generating unit and the storage unit for allowing the electric charge to flow in only a prescribed direction therebetween;

an electric charge limiter electrically connected in series with the directional coupler for limiting the flow of the electric charge through the directional coupler; and an electrometric unit electrically connected in parallel with the storage unit and operable to take a measurement of the electric charge stored in the storaae unit;

wherein the dosimeter is configured to be powered solely by the ultraviolet radiation source.

2. The dosimeter of claim 1 further comprising:

an optical attenuator disposed between the ultraviolet radiation source and the generating unit for decreasing the amount of ultraviolet radiation to which the generating unit is exposed to a prescribed level; and an optical short-wavelength cut-off filter disposed between the optical attenuator and the generating unit to limit the spectrum of the ultraviolet radiation to which the generating unit is exposed to within a prescribed range.

3. The dosimeter of claim 2 further comprising an optical window disposed between the filter and the generating unit to protect the generating unit from dust and moisture.

4. The dosimeter of claim 1 further comprising an electric charge discharge member electrically connected in parallel with the storage unit and operable to selectively discharge the electric charge stored within the storage unit for purposes of resetting the dosimeter for a new ultraviolet radiation measurement.

5. The dosimeter of claim 4 wherein:

the electric charge generating unit has a leakage impedance of not more than about 100 megaohms and generates not less than about 1 picocoulomb of the electric charge per 1 joule of ultraviolet radiation;

the directional coupler has a reverse impedance of not less than about 100 megaohms and a direct flow impedance of not more than about 10 megaohms;

the storage unit has a leakage impedance in ohms of not less than about 10 U/q where U is the electric potential of the storage unit in volts and q is the value of the stored electric charge in coulombs; and the electrometric unit has an input impedance in ohms of not less than about 20 U/q.

6. The dosimeter of claim 5 wherein the generating unit is selected from the group consisting of:

a vacuum phototube;

a light emitting diode; and a solid state photodiode.

7. The dosimeter of claim 5 wherein the directional coupler is selected from the group consisting of:

a silicon rectifier; and a germanium rectifier.

8. The dosimeter of claim 5 wherein the limiter is an electric resistor having a value of between about 100 ohms and 1 megaohm.

9. The dosimeter of claim 5 wherein the storage unit is an electric capacitor having a leakage resistance of not less than about 100 megaohms.

10. The dosimeter of claim 5 wherein the discharge member is an electric switch having an insulation resistance of not less than about 50 megaohms.

11. The dosimeter of claim 1 wherein the electrometric unit is electrically connected to the storage unit via a pair of cables extending therebetween and is selectively detachable from the storage unit.

12. The dosimeter of claim 11 wherein the cables each have an insulation resistance of not less than about 100 megaohms and a length of between about 2 and 200 inches.

13. The dosimeter of claim 1 wherein the generating unit, the storage unit, the directional coupler, the limiter, and the electrometric unit are disposed within a circularly configured, lens shaped housing defining opposed sides, with the display being mounted within one side of the housing and an opening being disposed in the other side of the housing for permitting the passage of the ultraviolet radiation to the generating unit.

14. The dosimeter of claim 1 wherein the electrometric unit comprises a repulsive charge electrometer.

15. The dosimeter of claim 1 wherein the electrometric unit includes a display and is further operable to convert the measurement of the electric charge stored in the storage unit to a reading corresponding to the amount of ultraviolet radiation produced by the ultraviolet radiation source and to present the reading on the display.

16. The dosimeter of claim 15 further comprising:

a power supply electrically connected to the electrometric unit solely for supplying power to the display thereof; and a switch electrically connected in series between the electrometric unit and the power supply for selectively applying power from the power supply to only the display of the electrometric unit for operating the display.

17. The dosimeter of claim 16 herein the electrometric unit is selected from the group consisting of:

a digital panel electrometer; and an analog panel electrometer.

18. The dosimeter of claim 17 wherein the electrometric unit is a digital panel electrometer having an input impedance of not less than about 100 megaohms.

19. The dosimeter of claim 16, wherein the power supply is a lithium battery having an electric capacity of not less than about 10 mA/hour.

20. The dosimeter of claim 19 wherein the switch has an insulation resistance of not less than about 10 megaohms.

21. A method for obtaining a measurement of ultraviolet radiation from an ultraviolet radiation source comprising the steps of:

(a) providing an ultraviolet radiation dosimeter having an electric charge generating unit, an electric charge storage unit electrically connected in parallel with the generating unit, a directional coupler electrically connected in series between the generating unit and the storage unit, an electric charge limiter electrically connected in series with the directional coupler, an electric charge discharge member electrically connected in parallel with the storage unit, and an electrometric unit electrically connected in parallel with the storage unit and including a display;

(b) exposing the generating unit to the ultraviolet radiation source;

(c) generating an electric charge via the generating unit which is proportional to the amount of ultraviolet radiation to which the generating unit is exposed;

(d) storing the electric charge in the storage unit;

(e) converting the electric charge via the electrometric unit to a reading which corresponds to the amount of ultraviolet radiation produced by the ultraviolet radiation source; and (f) presenting the reading on the display of the electrometric unit;

wherein steps (c), (d), and (e) are accomplished without the use of an external power supply other than for the ultraviolet radiation source.

22. The method of claim 21 wherein step (b) comprises discharging the electrical charge stored in the storage unit via the discharge member prior to the exposure of the generating unit to the ultraviolet radiation source.

23. The method of claim 21 wherein:

step (a) comprises providing the dosimeter with a power supply which is electrically connected to the electrometric unit; and step (f) comprises applying power from the power supply to only the display of the electrometric unit to operate the display.

* * * * *